(12) United States Patent
Oki

(10) Patent No.: US 7,583,873 B2
(45) Date of Patent: Sep. 1, 2009

(54) FABRICATION METHOD OF OPTICAL MODULE, OPTICAL MODULE, AND PLATFORM FOR OPTICAL MODULE

(75) Inventor: Shigenori Oki, Kawasaki (JP)

(73) Assignee: Fujitsu Limited, Kawasaki (JP)

(*) Notice: Subject to any disclaimer, the term of this patent is extended or adjusted under 35 U.S.C. 154(b) by 0 days.

(21) Appl. No.: 11/952,616

(22) Filed: Dec. 7, 2007

(65) Prior Publication Data

US 2008/0124026 A1 May 29, 2008

Related U.S. Application Data

(63) Continuation of application No. PCT/JP2005/010690, filed on Jun. 10, 2005.

(51) Int. Cl.
G02B 6/42 (2006.01)
H01L 31/12 (2006.01)
B29C 65/00 (2006.01)

(52) U.S. Cl. ............... 385/31; 385/88; 385/89; 257/81; 156/60; 156/182

(58) Field of Classification Search .......... 257/81; 385/88–89, 24, 37, 49, 93, 31; 156/60, 182
See application file for complete search history.

(56) References Cited

U.S. PATENT DOCUMENTS

| | | | | |
|---|---|---|---|---|
| 5,780,875 | A * | 7/1998 | Tsuji et al. ............ | 257/81 |
| 6,263,137 | B1 * | 7/2001 | Yoneyama et al. ......... | 385/49 |
| 6,445,857 | B1 * | 9/2002 | Korenaga et al. ........ | 385/52 |
| 6,530,698 | B1 * | 3/2003 | Kuhara et al. .......... | 385/88 |
| 6,765,948 | B2 * | 7/2004 | Murry et al. .......... | 372/107 |
| 6,823,116 | B2 * | 11/2004 | Inui et al. ............ | 385/39 |
| 7,254,300 | B2 * | 8/2007 | Nishie et al. .......... | 385/49 |
| 2003/0142896 | A1 | 7/2003 | Kikuchi et al. | |
| 2003/0219211 | A1 * | 11/2003 | Kim et al. ............ | 385/52 |
| 2005/0069261 | A1 * | 3/2005 | Arayama .............. | 385/52 |

FOREIGN PATENT DOCUMENTS

| | | | |
|---|---|---|---|
| JP | 1253705 | A | 10/1989 |
| JP | 3192316 | A | 8/1991 |
| JP | 8264748 | A | 10/1996 |
| JP | 9318850 | A | 12/1997 |
| JP | 11195809 | A | 7/1999 |
| JP | 200075155 | A | 3/2000 |
| JP | 2001108871 | A | 4/2001 |
| JP | 2003139980 | A | 5/2003 |
| JP | 2003344695 | A | 12/2003 |
| JP | 2004233896 | A | 8/2004 |
| JP | 961676 | A | 12/2007 |

OTHER PUBLICATIONS

International Search Report of PCT/JP2005/010690, date of mailing Jul. 19, 2005.

* cited by examiner

*Primary Examiner*—Brian Healy
*Assistant Examiner*—Guy G Anderson
(74) *Attorney, Agent, or Firm*—Fujitsu Patent Center

(57) ABSTRACT

In assembly of a number of optical devices (optical waveguide devices) to fabricate an optical module, the fabrication method of the optical module comprising: filling a plurality of openings for device mounting, the openings being formed on a platform, with a transparent liquid material; putting an optical waveguide device into at least one of the plurality of openings; and carrying out an active alignment process with the intention that a fine adjustment (waveguide alignment) of the position of each optical device can be realized with ease.

15 Claims, 6 Drawing Sheets

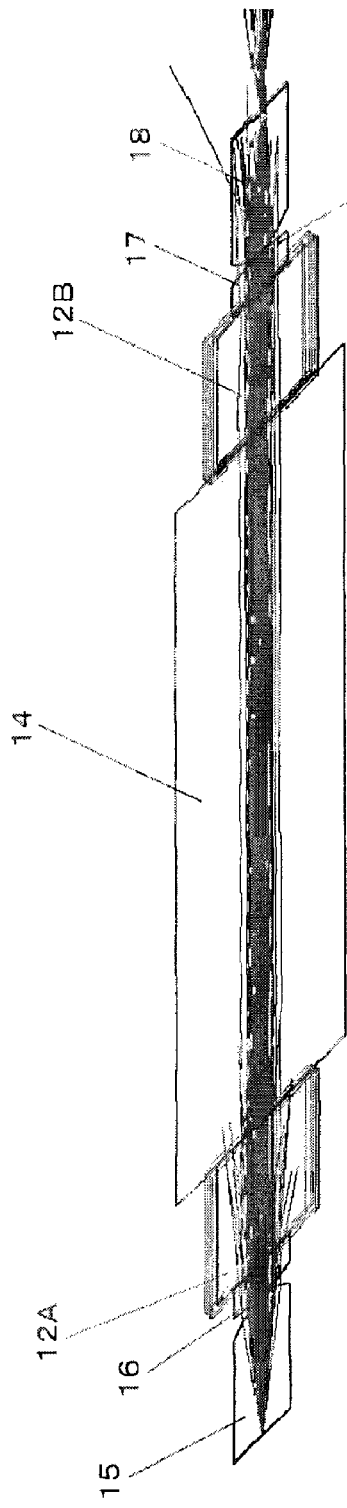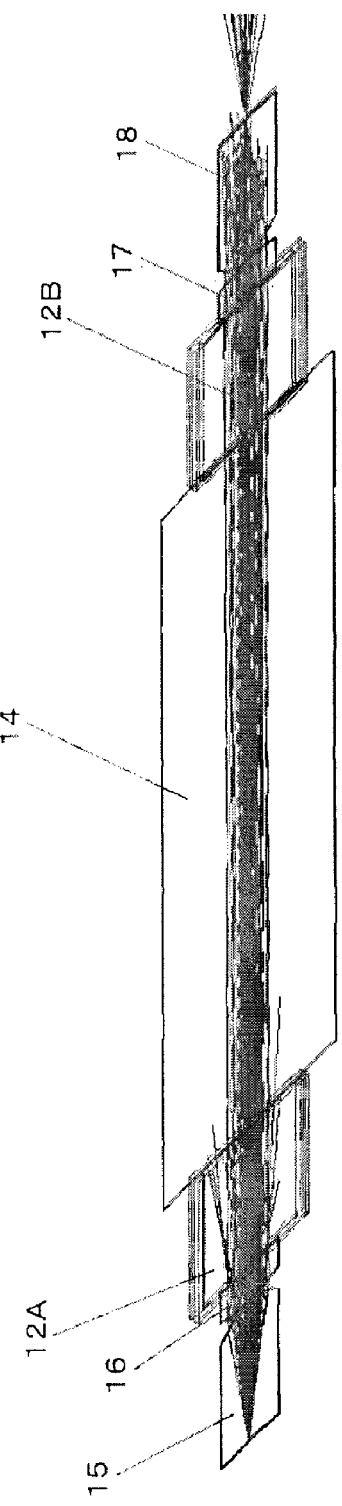

FABRICATION METHOD OF OPTICAL MODULE, OPTICAL MODULE, AND PLATFORM FOR OPTICAL MODULE

CROSS REFERENCE TO RELATED APPLICATION(S)

This application is a continuation application of PCT International Application No. PCT/JP2005/010690 filed on Jun. 10, 2005, in Japan, the contents of which are hereby incorporated by the reference.

TECHNICAL FIELD

This embodiment relates to a fabrication method of an optical module, an optical module and a platform for an optical module which are preferably used in assembly of a number of optical devices (e.g. lightwave transmission devices) used in, for example, optical communication.

BACKGROUND

As a solution to recent demands for mass production and cost reduction of optical modules, a mounting technique in which optical devices are hybridly integrated onto an Si platform or a PLC (Planer Lightwave Circuit) platform, is attracted.

In particular, in mounting technique (a planer mounting technique) which uses a PLC platform as a mounting substrate, optical devices are mounted on a common substrate wherein a waveguide has been formed on the surface. Therefore, this technique is suitable for downsizing an optical module and for simplifying the assembly process.

Further, in mounting an optical device onto a platform, an alignment operation is generally performed by active alignment technique in which the position of an optical device is adjusted while monitoring an actual optical coupling efficiency.

Following patent references 1-3 can be regarded as prior art related to the embodiment.

Patent reference 1 discloses a technique of controlling the beam diameter at a focus by filling a coupling between a lens and an optical waveguide with liquid. Patent reference 2 discloses a technique of controlling an incidence angle by filling the input section of an oblique-incidence optical receiving device with a liquid. These patent references however do not disclose a technical concept of using a filled liquid as a waveguide.

Further, patent reference 3 discloses a technique of a tube-shaped waveguide which is formed between a lens and a laser diode (LD) and which is made on a transparent rubber to realize a position-shift-proof structure.

Patent reference 1: Japanese Patent Application Laid-Open (KOKAI) Publication No. HEI 1-253705

Patent reference 2: Japanese Patent No. 3549086

Patent reference 3: Japanese Patent Application Laid-Open (KOKAI) Publication No. 2004-233896

SUMMARY

Therefore, one possible objection is to provide a fabrication method of an optical module, an optical module and a platform for an optical module which, when a number of optical devices (optical waveguide devices) are assembled to be made into an optical module, make it possible to realize fine adjustment (waveguide alignments) of the position of each optical module with ease.

The embodiment provides that a method for fabricating an optical module comprising: filling a plurality of openings for device mounting, the openings being formed on a platform, with a transparent liquid material; putting an optical waveguide device into at least one of the plurality of openings for device mounting; and carrying out an active alignment process.

BRIEF DESCRIPTION OF THE DRAWINGS

FIGS. 2(A)-2(C) are side views and FIGS. 2(D)-2(F) are plain views corresponding to the side views of FIGS. 2(A)-(C), respectively;

FIG. 6 A diagram showing a result of a ray tracing simulation performed on an optical module according to embodiment 3;

FIG. 7 A diagram showing a result of a ray tracing simulation performed on an optical module according to embodiment 4; and FIG. 8 Schematic diagrams explaining problems in a conventional fabrication method of optical modules.

DESCRIPTION OF REFERENCE NUMBER

Figure 1:
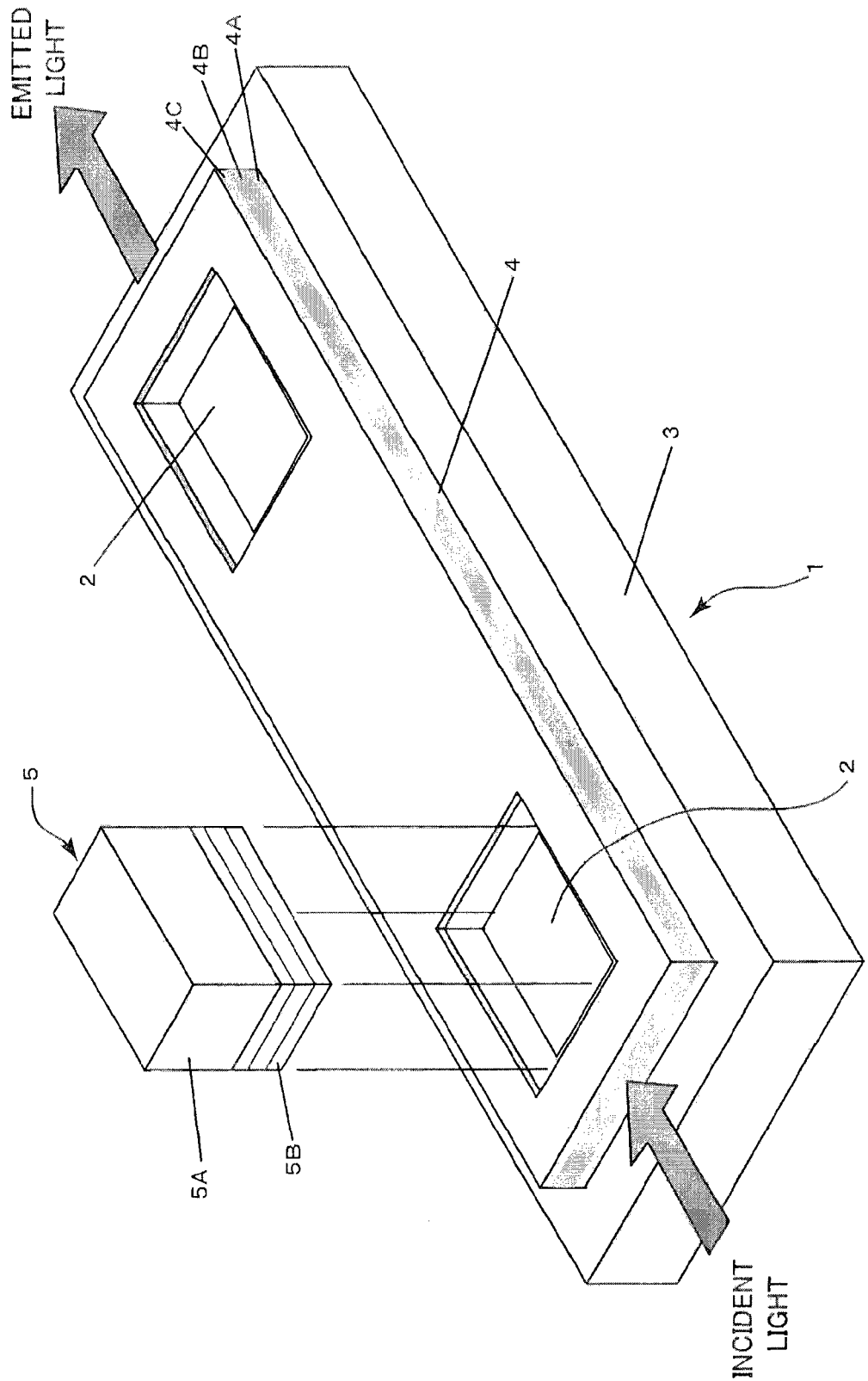
FIG. 1 A perspective view schematically illustrating a platform for an optical module and optical waveguide device (optical device) according to an embodiment.
Figure 2:
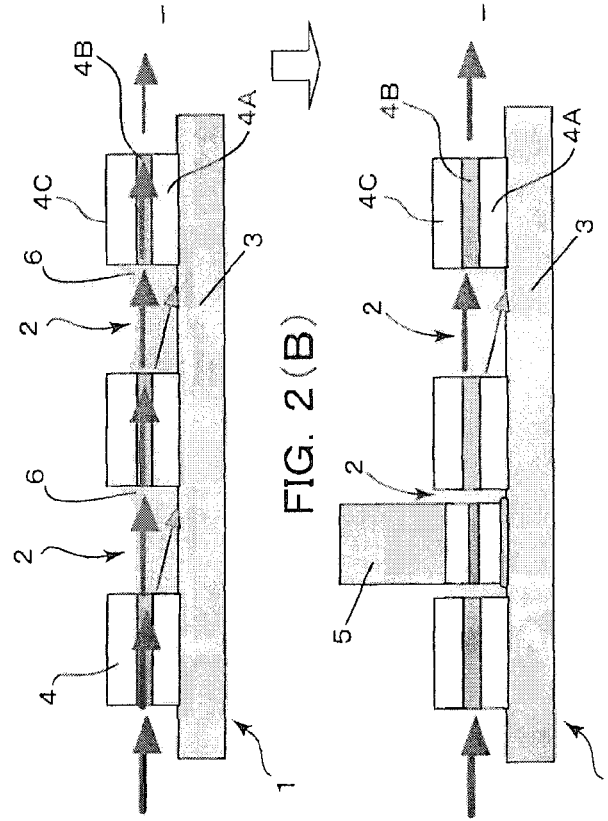
FIG. 2 Schematic diagrams explaining an optical module and a fabrication method of the optical module according to an embodiment.

1, 11 platform
2, 12A, 12B device mounting opening
3, 13 substrate
4 optical waveguide
4A lower cladding layer
4B core layer
4C upper cladding layer
5 optical waveguide device (optical device)
5A substrate
5B optical waveguide
6 transparent liquid material (transparent material, liquid material)
7 optical module
14 slab optical waveguide
15 input channel waveguide
16 collimator lens
17 condenser lens
18 output channel waveguide

DESCRIPTION OF THE EMBODIMENTS

As described above, in assembling a number of optical devices to fabricate an optical module, an alignment operation has to be performed for each optical device that is to be mounted on a platform.

For this reason, if a number of optical devices are to be mounted on a platform by the use of the active alignment technique, it takes considerable amounts of task and time to accomplish an alignment operation. Since this technique concerns planer mounting, a small degree of free of alignment is conversely a restriction and that makes it difficult to make a fine adjustment of a number of optical devices.

As shown in FIGS. 8(A)-8(D), assuming that a number of device mounting grooves 102 are formed on a platform (platform substrate) 100 having waveguides 101 connected to I/O ports on the both ends and that an optical module (e.g., a PLC optical module) is fabricated by mounting one of a number of optical devices (optical circuit devices, optical waveguide devices) 103 into each of the device mounting grooves 102, it is difficult to make a fine adjustment of positions of a number of optical devices by using the active alignment technique.

In other words, the performance of the active alignment technique requires to monitor light introduced via the input port at the output side.

Figure 8C:
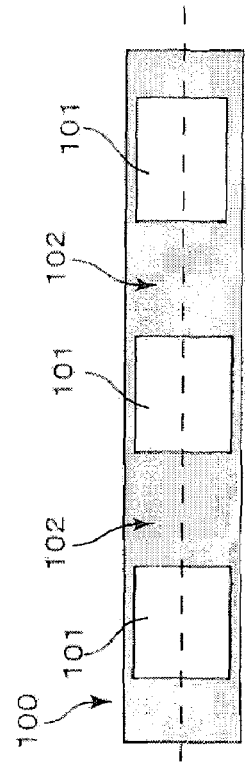
FIGS. 8(C) and 8(D) are plain views corresponding to the side views of FIGS. (A) and 8(B), respectively.
Figure 8D:
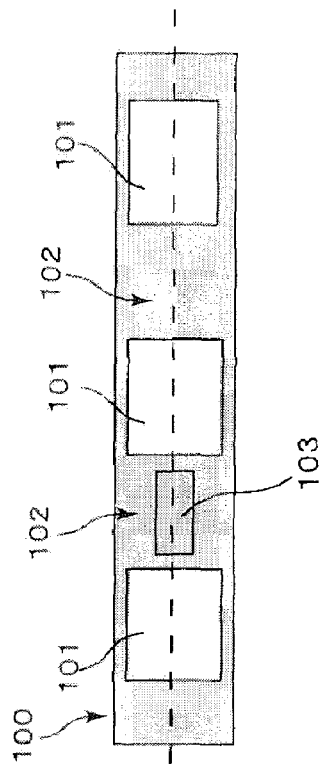
Figure 8A:
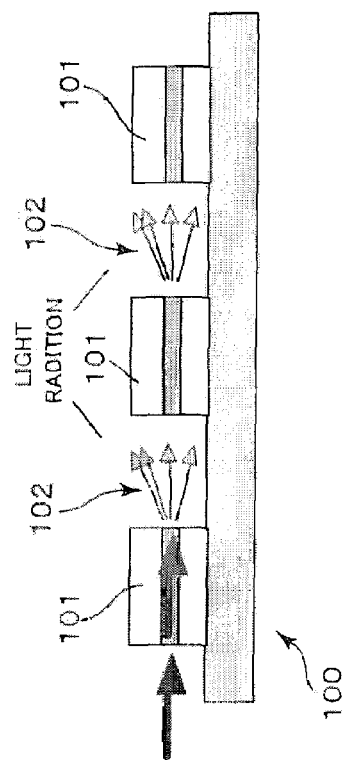
FIGS. 8(A) and 8(B) are side views.
Figure 8B:
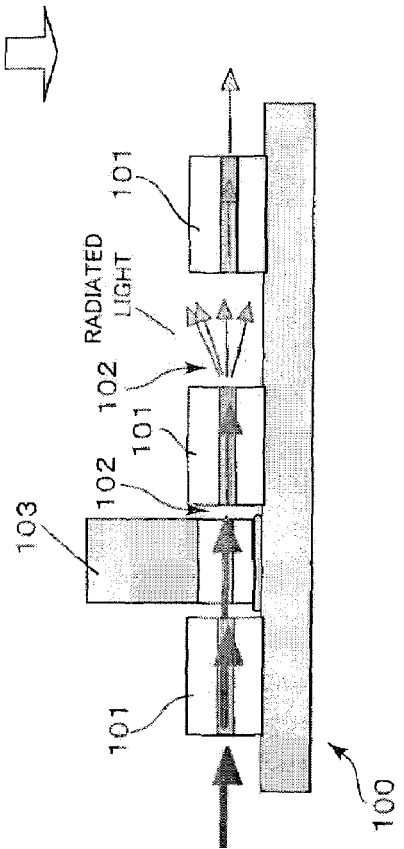

However, in the case where platform 100 includes a number of device mounting grooves 102 as shown in FIGS. 8(A) and 8(C), an incident light radiates in the device mounting grooves 102. For example, as shown in FIGS. 8(B) and 8(D), if a single optical device 103 is mounted to a device mounting groove 102, light radiates at another device mounting groove 102. For this reason, it is difficult to make adjustment of the position of each optical device in turn by the use of the active alignment technique.

As described above, an incident light radiates at device mounting grooves, it is difficult to make a fine adjustment of the position of optical devices by means of the active alignment technique.

On the other hand, it is conceivable that optical devices are firstly mounted onto all the device mounting grooves to secure the light pass from the input port to the output port and that the position of each of the optical devices is then adjusted by the active alignment technique.

However, it is difficult to precisely arrange optical devices onto all the device mounting grooves such that a light path for active alignment is secured.

The difficulty in fine adjustment of positions of the optical devices makes waveguide alignment performed by using the active alignment technique difficult to realize an optical module which is small in light loss and high in optical coupling efficiency.

Further, it is also difficult to realize a fabrication method of an optical module by previously fabricating a general-purpose platform and mounting optical devices onto the general-purpose platform, which method has been carried out in the production of an electronic module (e.g., a hybrid IC) by mounting electronic devices onto a general-purpose printed board.

Hereinafter, description will now be made in relation to a platform for an optical module, an optical module and a fabrication method of an optical module according to an embodiment with reference to accompanying drawings FIGS. 1-7.

An exemplary platform for an optical module is an PLC (Planar Lightwave Circuit) platform (platform substrate), and is used in assembly of three optical devices (optical waveguide devices) to be connected to one another via optical waveguides in production of an optical module (an optical integrated circuit) such as an optical switch.

For example, as shown in FIG. 1, platform 1 of an optical module according to the present embodiment has a number of device mounting openings 2 which are capable of being filled with a liquid material and are formed at predetermined distances.

Here, platform 1 is formed to include device mounting openings 2 which are capable of being filled with a transparent liquid material because filling device mounting openings 2 with a transparent liquid material confines light introduced into the device mounting openings 2 in the transparent liquid material to reduce the loss caused by radiation when an active alignment process is carried out.

Specifically, the present platform 1 includes, as shown in FIG. 1, substrate (e.g., a glass substrate or a silicon substrate) 3 and optical waveguide (planer waveguide) 4 formed on substrate 3, for example. Optical waveguide 4 includes a number of device mounting openings (device-mounting openings, device-mounting regions) 2 into which optical waveguide devices (optical devices) 5 are mounted. Namely, optical waveguide 4 includes a number of device mounting openings which are in the form of holes with openings on only the upper side.

Here, optical waveguide 4 is, for example, a slab optical waveguide formed by, for example, sequentially stacking lower cladding layer 4A, core layer 4B, and upper cladding layer 4C. Further, a sufficient optical waveguide 4 is exemplified by a polymer optical waveguide, a silica-glass optical waveguide or the like.

The structure of platform 1 for an optical module should by no means be limited to the above, and any platform is satisfactory if the platform has a number of device mounting openings (device-mounting regions) 2 which are capable of being filled with a liquid material and are formed at predetermined distances.

For example, platform 1 for an optical module may include a substrate, at least three optical waveguides which are formed at predetermined distances on the substrate, and sidewall sections which are formed on the substrate such that a number of device mounting openings (device-mounting regions) are formed between the optical waveguides. In detail, at least three optical waveguides in divided shapes are formed on the substrate so as to be positioned at predetermined distances and two sidewall sections are formed so as to contact with the right and the left side walls of the waveguides. Whereby, device mounting opening enclosed by the back wall of an optical waveguide, the front wall of another optical waveguide and the two sidewall sections may be formed.

Alternatively, sidewall sections may be formed on the opposite sides of a region into which an optical waveguide device is to be mounted (i.e., an device-mounting region that is to be a device mounting opening) so as to contact with the back wall of an optical waveguide, and the front wall of another optical waveguide.

Here, the height of each sidewall section is preferably higher than the top face of the core layers of each optical waveguides with the intension of preventing light from escaping from the core layer of an optical waveguide installed on the incident side of the device mounting opening 2 when an active alignment process is carried out.

In addition, each sidewall section is preferably formed such that the height of the sidewall section does not exceed the top of the upper cladding layer of each optical waveguide because, with this configuration, light surely returns to the core layers of the optical waveguides arranged on the emitted side of the device mounting opening 2 when an active alignment process is performed.

Platform 1 for an optical module with the above structure is fabricated by the following example method.

For example, optical waveguide 4 is fabricated by sequentially stacking lower cladding layer 4A, core layer 4B, and upper cladding layer 4C on substrate 3. Then, for example, an etching process is performed in order to form a number of device mounting openings 2 used to mount optical devices (optical devices) 5 therein at predetermined distances. In this example, the two or more device mounting openings 2 are regions which are enclosed by walls of optical waveguide 4 so as to be filled with a liquid material. This manner fabricates platform 1 with a number of device mounting openings 2.

The fabrication method of platform 1 is not limited to the above. Alternatively, optical waveguides in divided forms may be formed on the substrate at predetermined distances, and sidewall sections extending along the opposite sides of the optical waveguides arranged in series from the input end to the output end of the optical waveguides. In this case, a number of device mounting openings 2 which are capable of being filled with a liquid material are formed by regions enclosed by walls of the optical waveguides and walls of the sidewall sections.

Next, description will now be made in relation to a method for fabricating an optical module according to this embodiment.

Here, the fabrication method of an optical module (e.g., an optical switch) using the above platform will now be detailed with reference to FIGS. 2(A)-2(F).

First of all, as shown in FIGS. 2(A) and 2(D), a transparent liquid material (a transparent material, a liquid material) 6 fills a number (here two) of device mounting openings (device-mounting region) 2 formed on platform (a platform substrate) 1 fabricated in the above manner.

Transparent liquid material 6 used here may be any transparent liquid material which has a constant refractive index (preferably close to that of core layer 4B of optical waveguide 4). In particular, a preferable transparent liquid material has a stable refractive index and is excellent in optical characteristic (e.g., which makes no loss for a wavelength of light used in the optical module). Transparent liquid material 6 is exemplified by a matching oil or a curable resin material (a polymer material) such as a thermosetting resin material or photo-curable resin material (e.g., ultraviolet-light curable resin material).

In particular, transparent liquid material 6 is preferably fills each device mounting opening 2 to reach the top edge of the device mounting opening 2 (i.e., to at least the top of core layer 4B of optical waveguide 4). That creates an optical waveguide (a slab optical waveguide) at the position of each device mounting opening 2. Since during an active alignment process, light introduced into device mounting opening 2 is reflected by the top surface (the boundary face against another medium (here, air)) of transparent liquid material 6 and is thereby enclosed in transparent liquid material 6, a loss due to radiation can be greatly reduced.

After device mounting openings 2 are filled with transparent liquid material 6 as described above, an active alignment process for an input optical fiber and an output optical fiber is carried out in advance of mounting optical waveguide device 5 into device mounting opening 2.

In succession, as shown in FIGS. 2(B) and 2(E), after an optical waveguide device (optical device) 5 is put into one (in this example, device mounting opening 2 positioning at the input side) among a number of device mounting openings 2 filled with transparent liquid material 6, an active alignment process is carried out to make the fine adjustment of the position of the mounted optical waveguide device 5. In this example, optical waveguide device 5 is formed by substrate 5A and optical waveguide 5B (see FIG. 1).

In the present embodiment, even in a state in which device mounting opening 2 does not mount optical waveguide device 5 therein, device mounting opening 2 is filled with transparent liquid material 6 whereby a path of light is secured and light introduced from the input side for active alignment is monitored at the output side. As a consequence, an active alignment can be carried out in a state in which a single optical waveguide device 5 is mounted (put) into each device mounting openings 2 in turn. That secures a light path for active alignment and therefore solves the problem of difficulty in precise alignment of all the device mounting openings 2 with optical waveguide device 5.

After performing an active alignment process for a is single optical waveguide device 5, the optical waveguide device 5 is fixed (mounted) inside device mounting opening 2.

For example, in the case where transparent liquid material 6 is a matching oil, the optical waveguide device 5 may be fixed inside the device mounting opening 2 with, for example, an adhesive (preferably a transparent adhesive). If a curable resin material is used as transparent liquid material 6, the curable resin material used as transparent liquid material 6 is cured after the active alignment of the optical waveguide device 5 is performed, so that the optical waveguide device 5 is fixed inside the device mounting opening 2. To sum up, optical waveguide device 5 may be fixed inside device mounting opening 2 with a material different from transparent liquid material 6 filling the device mounting opening 2 or with a material same as transparent liquid material 6 filling the device mounting opening 2.

After that, as shown in FIGS. 2(C) and 2(F), another optical waveguide device 5 is mounted (put) into the other device mounting opening 2 (here, device mounting opening 2 at the output side) filled with transparent liquid material 6, and an active alignment process is then performed to make a fine adjustment of the position of the other optical waveguide device 5.

After performing active alignment of the other optical waveguide device 5 as described above, further another optical waveguide device 5 is fixed (mounted) inside another device mounting opening 2 in the same manner. That consequently fabricates an optical module (e.g., an optical switch) 7 wherein optical waveguide device 5 are mounted into each of the device mounting opening 2.

The optical module 7 in this example is fabricated by mounting optical waveguide device 5 into all the device mounting openings 2, but the embodiment should by no means be limited to this. A fabricated optical module 7 may have at least one device mounting opening 2 in which optical waveguide device 5 is mounted.

In other words, among a number of device mounting openings 2, one or more device mounting openings 2 which do not need to mount optical waveguide devices 5 therein may be filled with, for example, transparent liquid material 6 but may not mount optical waveguide devices 5 therein whereby optical module 7 is fabricated. In particular, transparent liquid material 6 preferably fills device mounting opening 2 to the top edge of the optical waveguide 4. In addition, a transparent material is a material with a refractive index larger than that of a medium in contact with the surface of the transparent material, so that light used in optical module 7 is confined in the transparent material to inhibit a loss due to radiation. In the normal case, since the outside of device mounting openings 2 is air, a transparent material is a material with a refractive index of 1 or larger, and may be an adhesive, a curable material resin and others, for example.

In the case where a curable resin material is used as transparent liquid material 6, it is sufficient to cure the curable resin material used as transparent liquid material 6 filling inside device mounting openings 2.

Alternatively, device mounting opening 2 in which optical waveguide device 5 is to be mounted may be filled with a matching oil as transparent liquid material 6 and device mounting openings 2 in which optical waveguide devices 5 is not to be mounted may be filled with a curable resin material as transparent liquid material 6. In this case, one or more optical waveguide device 5 which have undergone alignment may be fixed inside device mounting openings 2 with, for example, an adhesive, and the curable resin material may be cured inside device mounting openings 2 in which no optical waveguide device 5 is mounted.

As described above, since the embodiment fabricates an optical module 7 by burying device mounting opening 2 in which optical waveguide device 5 is not mounted with a transparent material, a platform 1 for an optical module which platform is fabricated in the method above described can be used as a general-purpose platform (a general-purpose waveguide platform). In other words, such a platform can be used in a design of various modules and consequently platforms of the same type can be made into various types of optical modules.

Next, an optical module according to this embodiment will now be described.

Here, the description will be made in relation to the structure of an optical module (e.g., an optical switch) fabricated in the above fabrication method of an optical module with reference to FIG. 2(C).

As shown in FIG. 2(C), an optical module of this embodiment includes platform 1 fabricated in the above manner and optical waveguide devices (optical devices) 5 mounted in device mounting openings (gaps) 2, the space between optical waveguide device 5 and corresponding device mounting opening 2 being filled with a transparent material.

In a preferable mode, device mounting openings 2 are filled with a transparent material as high as the top edge of optical waveguide 4. A transparent material may be a matching oil, an adhesive, or a curable resin material, and may be in the form of liquid or cured solid. Further, a transparent material is higher in refractive index than a medium with which the material is in contact. Since the outside of device mounting openings 2 is air, the transparent material is a material having a refractive index of 1 or higher.

The optical module of this example assumes to have a number of device mounting openings 2 each of which mounts optical waveguide device 5 therein, but the present invention should by no means be limited to this. As an alternative, it is sufficient that at least one of device mounting openings 2 mounts optical waveguide device 5 therein. In this case, the remaining device mounting openings 2, in which no optical waveguide device 5 is mounted, are filled with a transparent material.

Also in this case, as a preferable mode, device mounting openings 2 without optical waveguide devices 5 are filled with a transparent material to reach the wall top edge of optical waveguide 4. A transparent material is an adhesive, a curable resin material or the like. Further, a transparent material is a material larger in refractive index than a medium with which the surface of the transparent material is in contact. In the normal case, since the outside of device mounting openings 2 is air, a transparent material has a refractive index of 1 or higher.

According to the fabrication method of an optical module, the optical module and the platform for an optical module of the embodiment, in assembly of a number of optical waveguide devices (optical devices) 5 to fabricate optical module 7, it is advantageously possible to make a fine adjustment (alignment operation) of the position of each optical waveguide device 5 with ease. In other words, a cost-effective mounting method can be realized. Burying device mounting opening 2 in which optical waveguide device 5 is not mounted with a transparent material can realize a general-purpose platform, which may further improve cost effectiveness.

The present invention should by no means be limited to the foregoing embodiment, but various alternations and modifications can be suggested without departing from the gist of the present embodiment.

EXAMPLES

Hereinafter, the embodiments will now be detailed by examples with reference to FIGS. 3-7, but the present invention is not limited to these examples.

Figure 3:
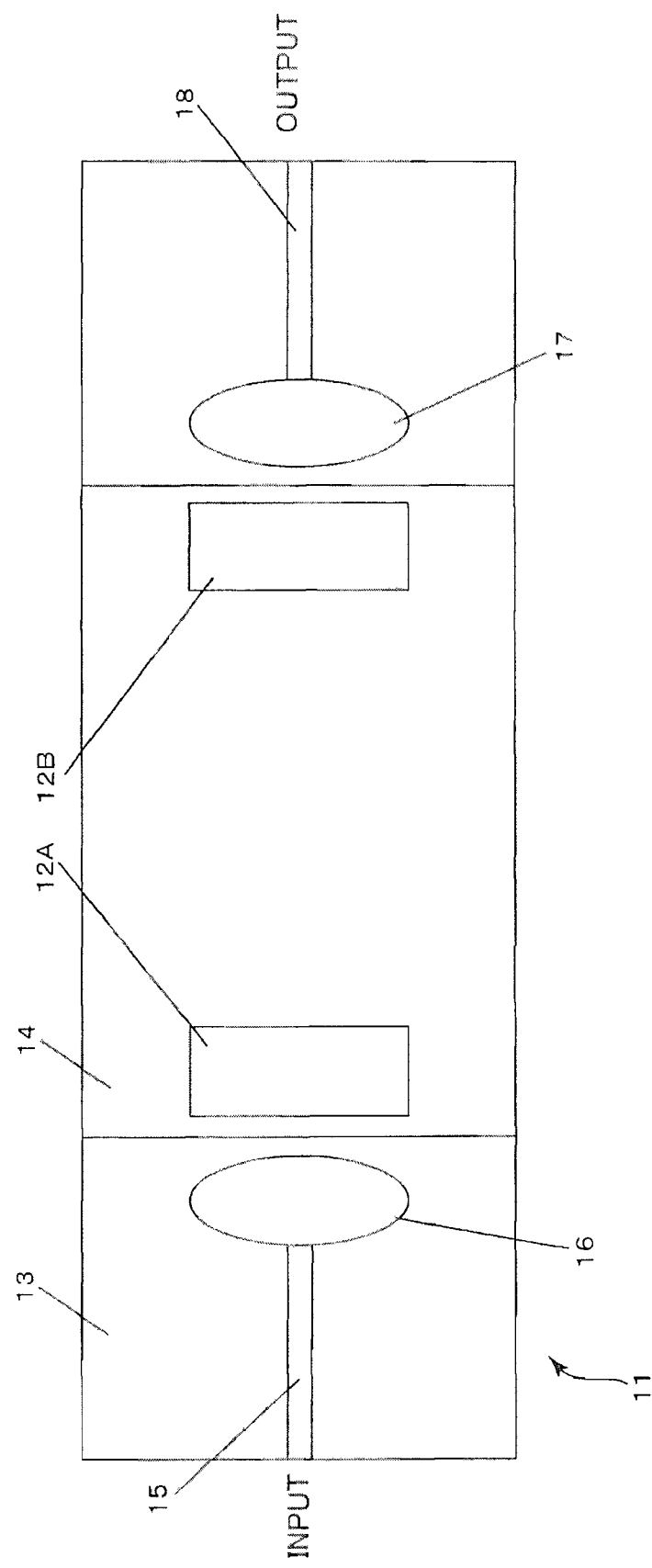
FIG. 3 A plain view schematically showing a configuration of an optical module according to an embodiment.

This example fabricated a platform substrate (a PLC substrate) 11 the light path of which is interposed by two device mounting openings (openings for device mounting) 12A and 12B, as shown in FIG. 3 and confirmed advantages of the embodiment by comparing losses in various cases of: both device mounting openings 12A and 12B being empty (example 1, see FIG. 4); both device mounting openings 12A and 12B being filled with transparent material 6 (example 2, see FIG. 5); one device mounting opening 12A mounting optical waveguide device (optical device) 15 therein (example 3, see FIG. 6); and both device mounting openings 12A and 12B mounting optical waveguide devices (optical devices) 15 therein (example 4, see FIG. 7).

[Structure and Fabrication Method of a Platform Substrate]

Platform 11 is fabricated in the following method.

First of all, a polymer optical waveguide (see FIG. 3) was formed on the entire surface of quartz glass substrate 13 using transparent epoxy resin V259, product of Nippon Steel Chemical Co., Ltd. The polymer optical waveguide has a lower cladding layer of 1.55 in refractive index and 20 μm in thickness, a core layer of 1.57 in refractive index and 40 μm in thickness, and an upper cladding layer of 1.55 in refractive index and 20 μm in thickness.

Devices for an optical circuit were built by dry etching. Specifically, as shown in FIG. 3, input channel waveguide 15, planer collimator lens 16, first device mounting opening 12A, slab optical waveguide 14, second device mounting opening 12B, condenser lens 17 and output channel waveguide 18 in order of from the input end to the output end were formed. Here, device mounting openings 12A and 12B were formed by dry etching digging the polymer optical waveguide into hollow shapes. The remaining portion (outer wall section) of the polymer optical waveguide, on which portion the etching was not performed, was used as sidewall sections to store a liquid material in device mounting openings 12A and 12B. Further, lenses 16 and 17, and slab optical waveguide 14 were formed by removing the unnecessary encompassing part (polymer optical waveguide). Channel waveguides 15 and 18 are 5 mm in length and 8×8 μm in core section; lens 16 and 17 are 2 mm in length and 1 mm in width; device mounting openings 12A and 12B are 2 mm in length and 5 mm in width; and slab optical waveguide 14 is 10 mm in length and 10 mm in width.

[Evaluation Manner]

An evaluation was made by introducing light beam of 1.55 μm/3 mW in wavelength emitted from a multimode fiber connected to input channel waveguide 15 by butt joint and measuring the power of light coupled through a multimode fiber connected to output channel waveguide 18.

Example 1

Figure 4:
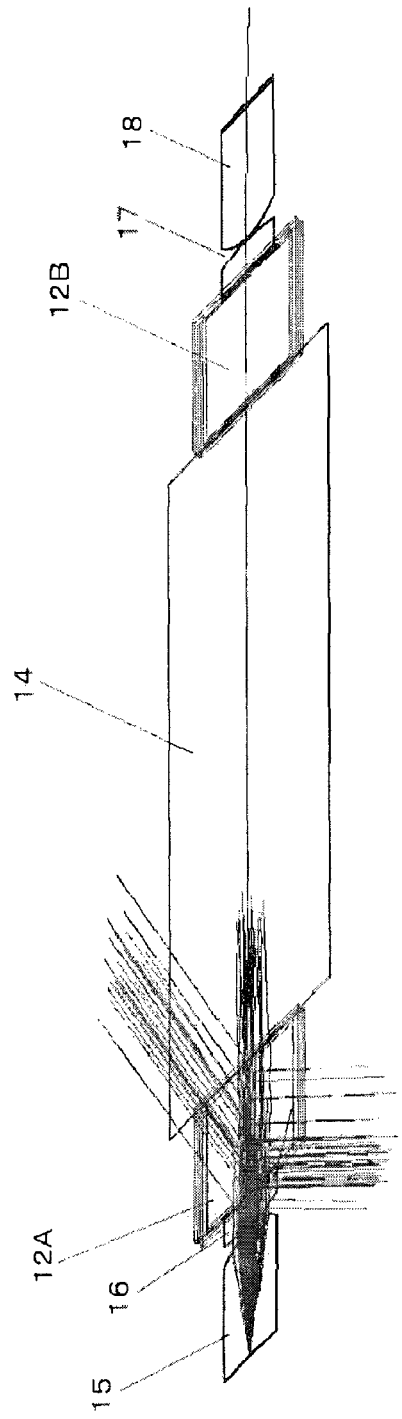
FIG. 4 A diagram showing a result of a ray tracing simulation performed on an optical module according to embodiment 1.
Figure 5:
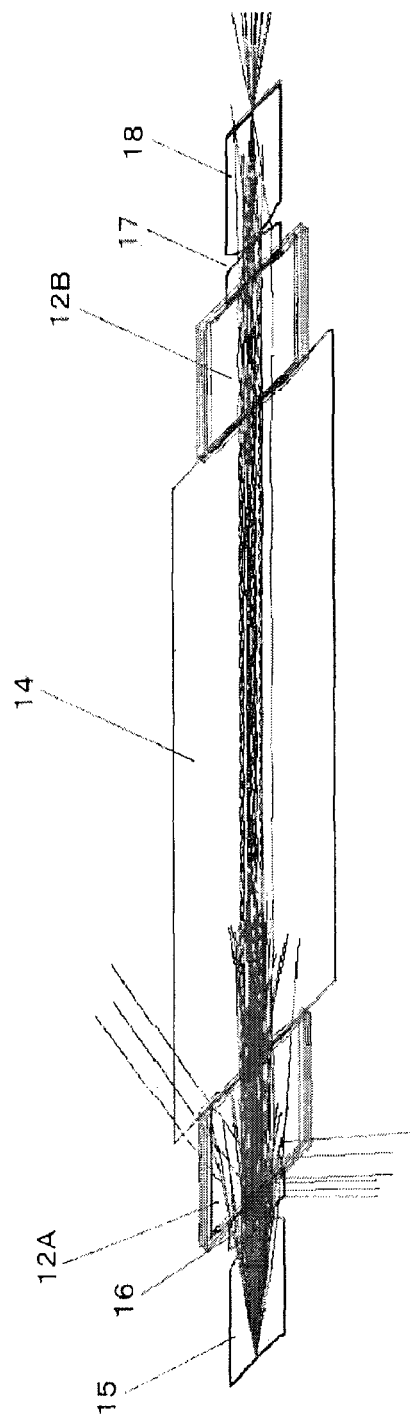
FIG. 5 A diagram showing a result of a ray tracing simulation performed on an optical module according to embodiment 2.

First of all, the power of light having emitted via two empty device mounting openings 12A and 12B was measured and the insertion loss was calculated to be 19.5 dB. As shown in FIG. 4 showing a result of simulation by ray tracing software, most of the power was considered to have been lost by radiation at device mounting openings 12A and 12B.

Example 2

Next, a ultraviolet-light curable resin material (a polymer material of 1.5 in refractive index) produced by NTT AT Corp. as a transparent liquid material (transparent material) was dropped into two device mounting openings 12A and 12B and the surplus resin material was removed by spin coating so that the top face (the fluid level) of the transparent liquid material positions in the proximity of the tops of the wall of device mounting openings 12A and 12B. In this state, the power of light having emitted was measured and the insertion loss was calculated to be 9.3 dB that exhibited an extensive improvement. As shown by the simulation result of the ray tracing software in FIG. 5, the main reason for the extensive improvement is presumed to be reduction in losses caused by radiation at the device mounting openings.

Example 3

In succession, a polymer waveguide device (an optical waveguide device, an optical device) was fabricated to be used as an optical waveguide device. The fabricated polymer waveguide part has the outer shape of 1.960 mm in length and 4 mm in width and includes a slab waveguide identical in configuration to the optical waveguide formed on the quartz glass substrate.

The polymer waveguide device thus fabricated was put into the first device mounting opening 12A and waveguide alignment (active alignment) was performed while introducing light. After the waveguide alignment, the power of light having emitted was measured and the entire insertion loss was calculated with the result that the insertion loss was improved to be 8.0 dB. As shown by the simulation result of the ray tracing software in FIG. 6, the main reason for the improvement is presumed to be the fine adjustment made on the position of the polymer waveguide parts as well as the reduction in losses caused by radiation at the device mounting openings.

Example 4

After the completion of the above alignment of the polymer waveguide device, the ultraviolet-light curable resin material which was filled with the first device mounting opening 12A in which the polymer waveguide device was mounted was irradiated with ultraviolet light, so that the resin material was cured. The polymer waveguide device was consequently fixed to first device mounting opening 12A. The same polymer waveguide part was then put into second device mounting opening 12B and waveguide alignment (active alignment) was performed while introducing light. After the waveguide alignment, the power of light having emitted was measured and the insertion loss (the entire loss) was calculated to be 3.8 dB. As shown by the simulation result of the ray tracing software in FIG. 7, the main reason for the improvement is presumed to be the fine adjustment made on the position of the polymer waveguide device as well as the reduction in losses due to radiation at the device mounting openings.

CONCLUSION

As understood from the comparison between examples 1 and 2, filling device mounting openings 12A and 12B with a transparent material could greatly reduce losses at device mounting openings 12A and 12B. With this method, it is possible to fabricate an optical module having device mounting openings 12A and 12B in which no optical waveguide device (no optical device) is mounted by burying the device mounting openings 12A and 12B with a transparent material and, as a result, fabrication of a general-purpose platform can be realized.

In addition, as clarified with reference to above examples 3 and 4, since active alignment precisely adjusts the positions of waveguide devices mounted in device mounting openings 12A and 12B, the losses can be reduced.

What is claimed is:

1. A method for fabricating an optical module comprising:
    filling a plurality of openings for device mounting, the openings being formed on a platform, with a transparent liquid material;
    placing an optical waveguide device into one of the plurality of openings; and
    carrying out an active alignment process for the optical waveguide device by using light passing through the optical waveguide device and one or more of the transparent-liquid-material-filled openings.

2. The method for fabricating an optical module according to claim 1, further comprising:
    fixing the optical waveguide device with an adhesive after carrying out the active alignment process.

3. The method for fabricating an optical module according to claim 1, wherein
    the transparent liquid material is a curable resin material; and
    said method further comprises hardening the curable resin material so that the optical waveguide device is fixed after carrying out the active alignment.

4. The method for fabricating an optical module according to claim 1, further comprising:
    carrying out an active alignment process for an input optical fiber and an output optical fiber after filling the plurality of openings with the transparent liquid material and before placing the optical waveguide device into one of the plurality of openings.

5. An optical module comprising:
    a platform including an optical waveguide having a plurality of openings for device mounting, the openings being formed at predetermined distances and capable of being filled with a liquid material; and
    an optical waveguide device mounted in at least one of the plurality of openings,
    wherein a space between the optical waveguide device and the at least one opening is filled at least in part with a transparent material.

6. An optical module comprising;
    a platform having a plurality of openings for device mounting, the platform including a substrate, at least three optical waveguides formed in series on the substrate, and sidewall sections formed on said substrate such that the plurality of openings are formed between said optical waveguides, the openings being formed at predetermined distances and capable of being filled with a liquid material; and an optical waveguide device mounted in at least one of the plurality of openings, wherein a space formed between the optical waveguide device and the at least one opening is filled with a transparent material.

7. The optical module according to claim 6, wherein a height of each of said sidewall sections is higher than a height of a core layer of each of said optical waveguides.

8. The optical module according to claim 6, wherein a height of each of said sidewall sections is not higher than a height of an upper cladding layer of each of said optical waveguides.

9. The optical module according to claim 5, wherein an opening in which the optical waveguide device is not mounted among the plurality of openings is filled with a transparent material.

10. The optical module according to claim 5, wherein the transparent material is a curable resin material.

11. The optical module according to claim 5, wherein the transparent material is an adhesive.

12. The optical module according to claim 5, wherein the transparent material is larger in refractive index than a medium with which the surface of the transparent material is in contact.

13. A platform for an optical module comprising: a plurality of openings for device mounting, the openings being formed at predetermined distances and capable of being filled with a liquid material; a substrate; and a waveguide formed on the substrate, the waveguide having the plurality of openings for device mounting arranged such that a light path includes at least a portion of the waveguide and the plurality of openings.

14. A platform for an optical module comprising:

a plurality of openings for device mounting, the openings being formed at predetermined distances and capable of being filled with a liquid material;

a substrate;

at least three optical waveguides formed in series at predetermined distances on said substrate; and sidewall sections formed on said substrate such that said plurality of openings are formed between the optical waveguides.

15. The optical module according to claim 5, wherein the platform further includes a substrate and the optical waveguide is formed on the substrate.

* * * * *